United States Patent [19]

Wernecke et al.

[11] Patent Number: 5,148,929
[45] Date of Patent: Sep. 22, 1992

[54] MULTI-COUPLING DEVICE FOR CRANE HYDRAULIC LINES

[75] Inventors: Charles R. Wernecke, Manitowoc; Marlin P. Strouf, Two Rivers, both of Wis.

[73] Assignee: The Manitowoc Company Inc., Manitowoc, Wis.

[21] Appl. No.: 762,771

[22] Filed: Sep. 20, 1991

[51] Int. Cl.⁵ .......................................... B66C 23/62
[52] U.S. Cl. .................................................. 212/180
[58] Field of Search ............... 212/175, 176, 179, 180, 212/181, 182, 223, 232, 245, 253, 255, 271

[56] References Cited

U.S. PATENT DOCUMENTS

| | | | |
|---|---|---|---|
| 3,125,226 | 3/1964 | Mork et al. | 212/181 |
| 3,921,817 | 11/1975 | Petrik et al. | 212/181 |
| 3,941,252 | 3/1976 | Six et al. | 212/181 |
| 4,091,935 | 5/1978 | Whittingham | 212/181 |
| 4,273,244 | 6/1981 | Jensen et al. | 212/181 |
| 4,601,401 | 7/1986 | Wittman et al. | 212/180 |
| 4,643,320 | 2/1987 | Larsen | 212/180 |
| 4,662,527 | 5/1987 | Cuhel | 212/180 |

OTHER PUBLICATIONS

16-Page Brochure, Stäubli Company, Undated.
26-Page Brochure, Walther-Präzision Company, Undated.
6-Page Brochure, Snap-tite Multi-Coupling Panel, Published Nov., 1989.
2-page Brochure, Snap-tite Inc. HNS Series.
8-Page Brochure, 71 and 75 Series High Pressure Quick Disconnect Couplings, published by Snap-tite Co., Oct., 1990.

Primary Examiner—Jesus D. Sotelo
Assistant Examiner—Stephen P. Avila
Attorney, Agent, or Firm—Willian, Brinks, Olds, Hofer, Gilson & Lione

[57] ABSTRACT

A multi-coupling device for connecting multiple hydraulic lines between first and second portions of a crane is disclosed. The device is for use where the crane portions are not aligned with a tolerance as small as that necessary for connecting the hydraulic line couplings. The multi-coupling device comprises a first plate rigidly holding the first part of each of the couplings in a spaced relationship, the first plate being rigidly fixed to a first crane portion; a second plate rigidly holding the second part of each of the couplings in a spaced relation corresponding to the spaced relation of the first coupling parts; a mounting device which mounts the second plate on a second crane portion with a freedom of movement at least as great as the tolerance in alignment between the first and second crane portions; and alignment means for aligning the first and second plates.

20 Claims, 7 Drawing Sheets

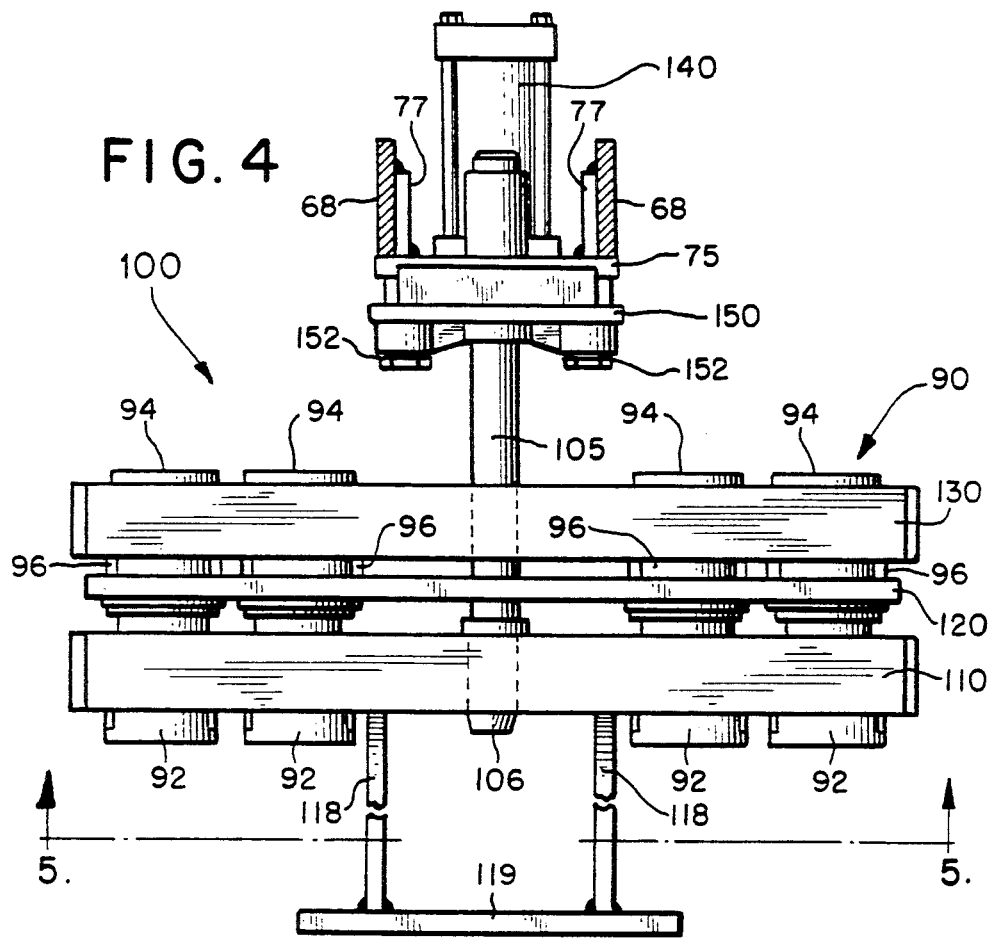
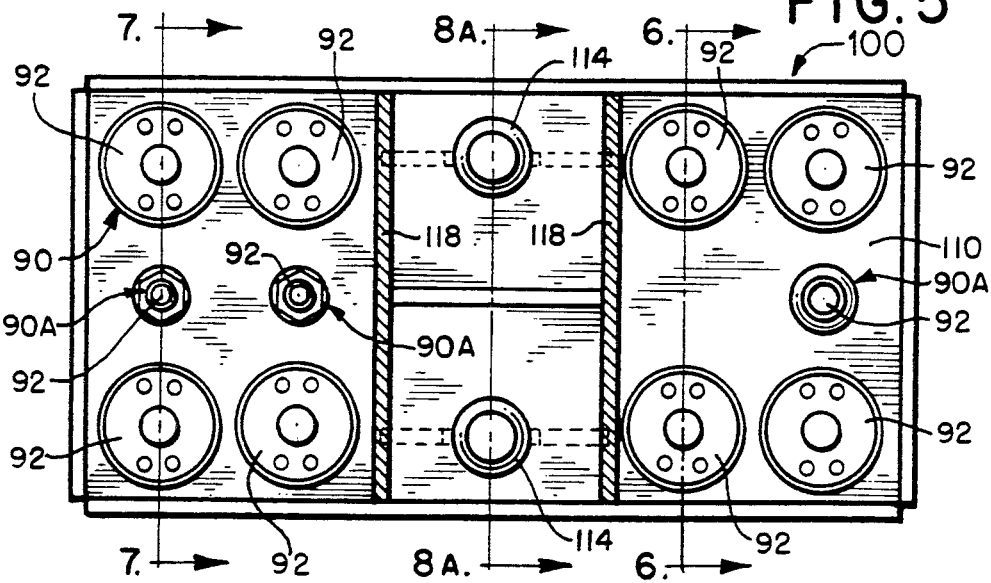

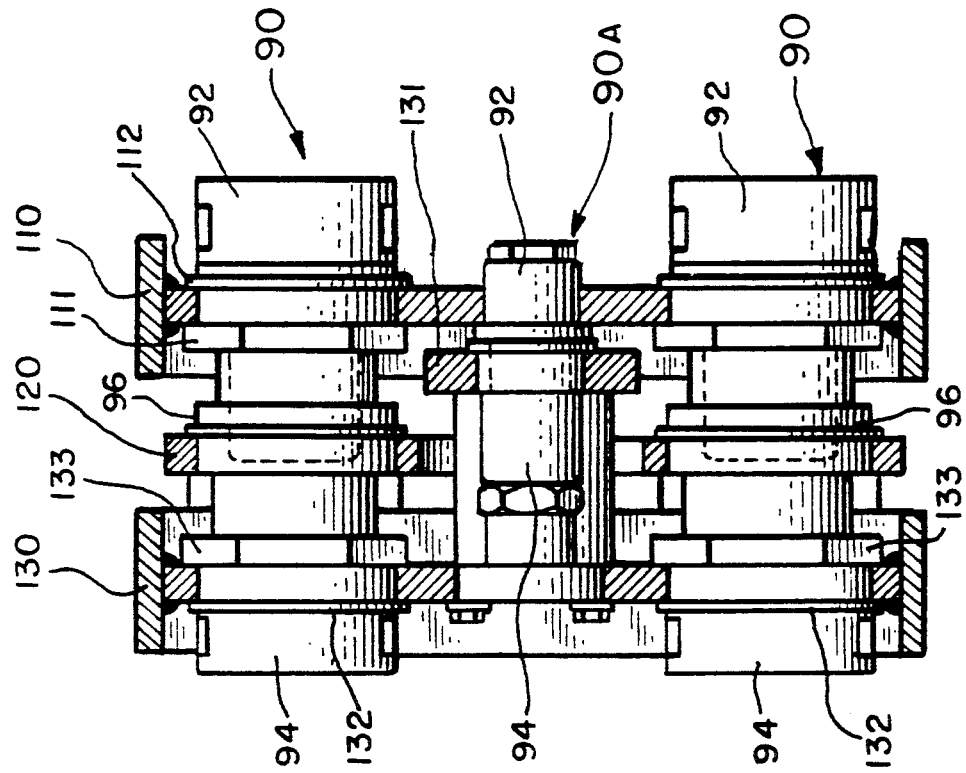
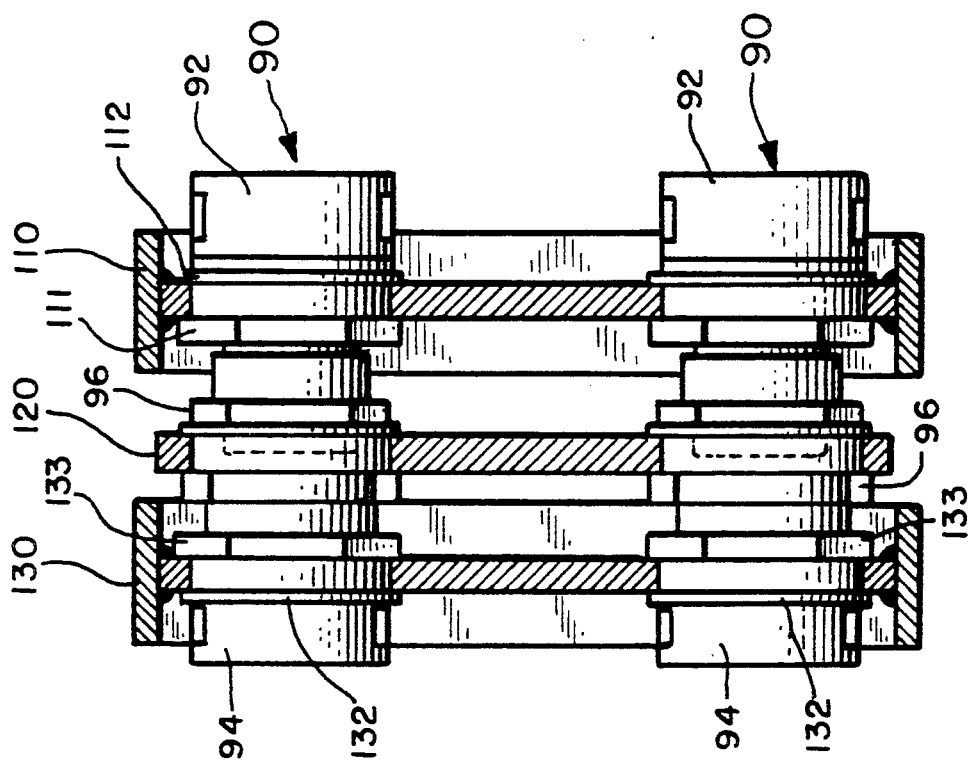

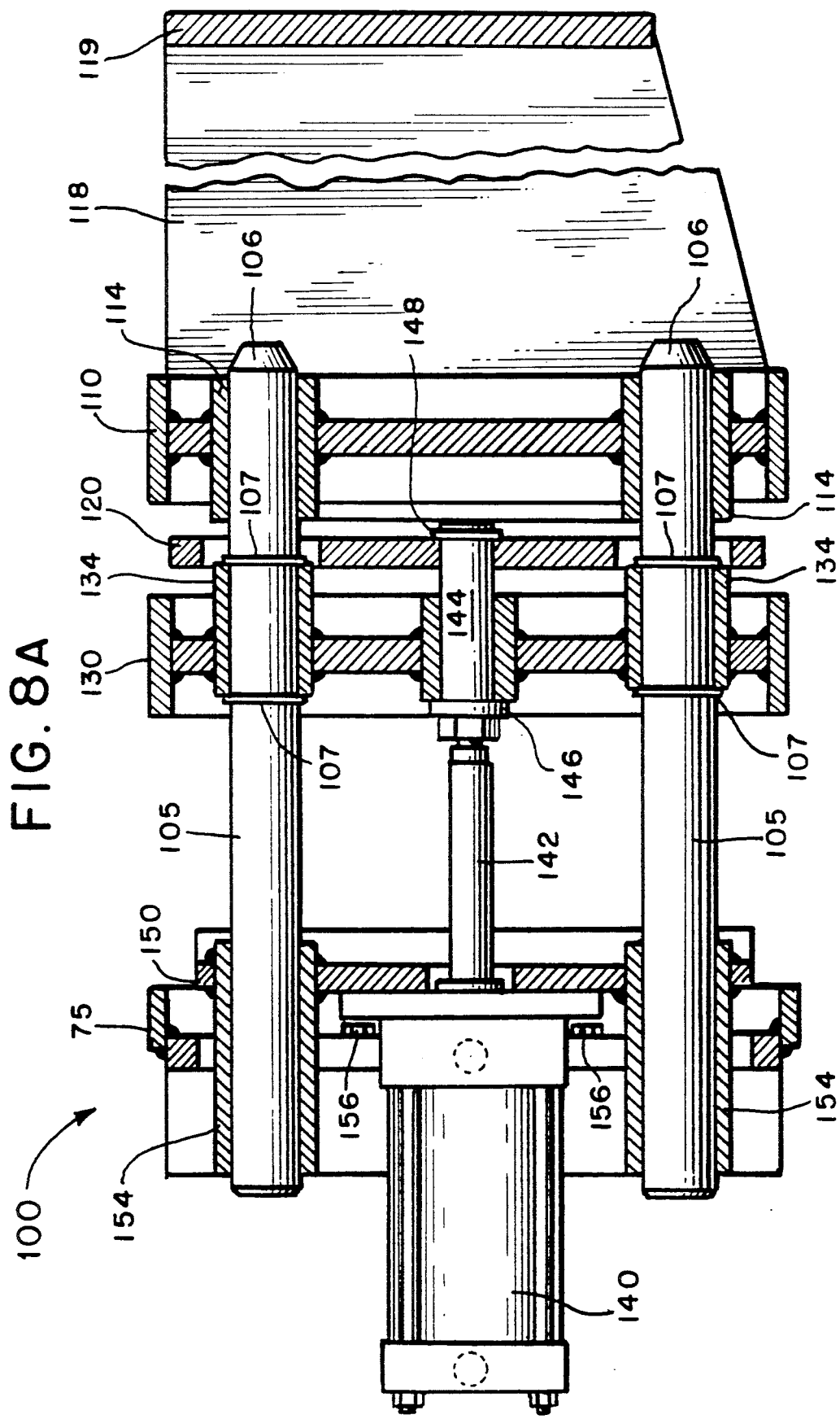

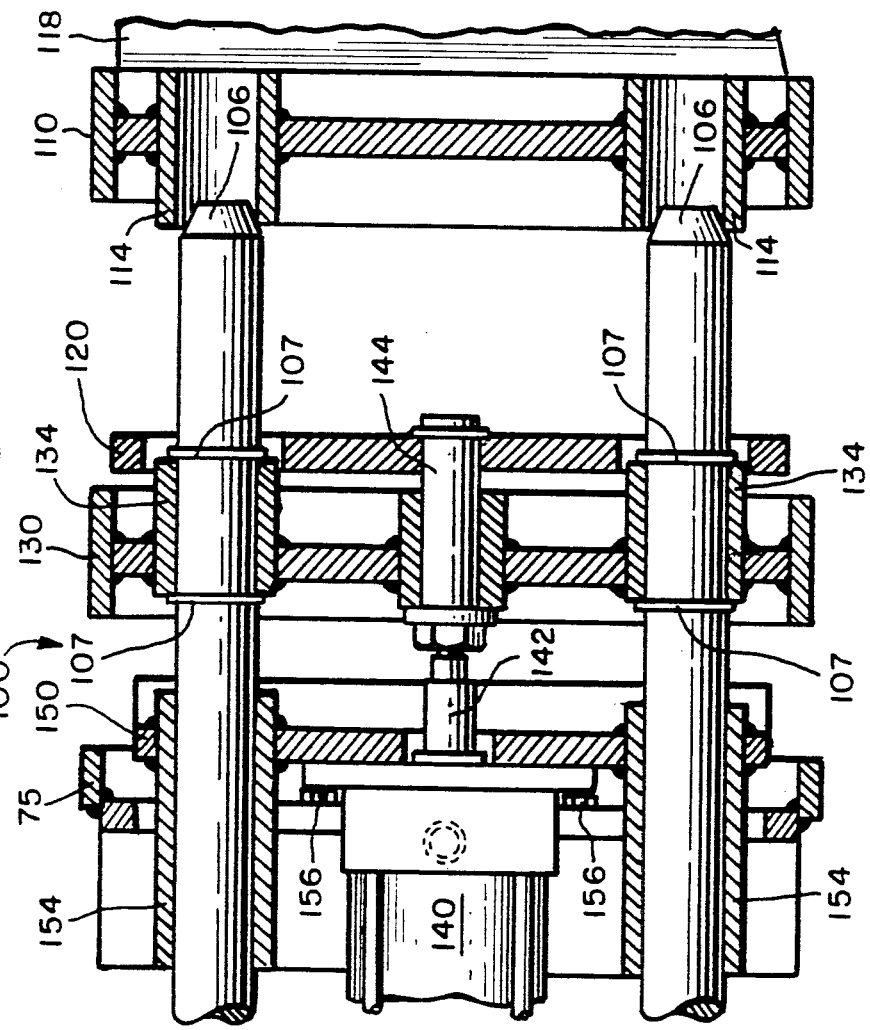
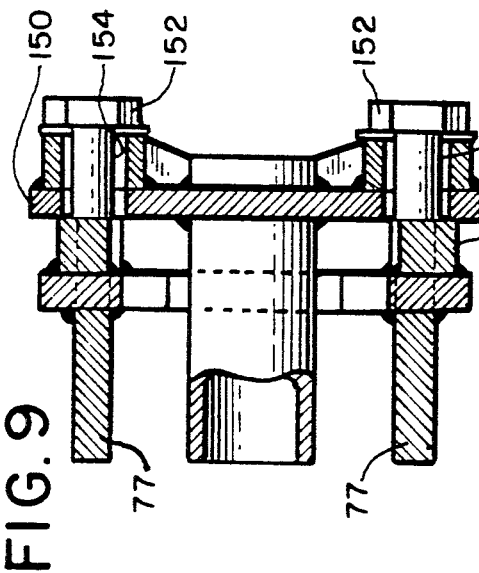
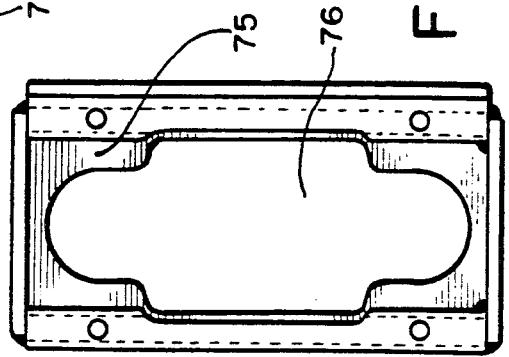

MULTI-COUPLING DEVICE FOR CRANE HYDRAULIC LINES

BACKGROUND OF THE INVENTION

The present invention relates to multi-coupling devices and primarily to a multi-coupling device for making connections between hydraulic lines running between disconnectable sections of a crane.

Construction equipment, such as cranes or excavators, often must be moved from one job site to another. Moving a crane or excavator can be a formidable task when the machine is large and heavy. For example, highway limits on vehicle-axle loads must be observed and overhead obstacles can dictate long, inconvenient routings to a job site.

One solution to improving the mobility of large construction machines is to disassemble them into smaller, more easily handled components. This typically involves undecking (separating) the upper works assembly from the lower works assembly. For larger cranes, further disassembly of the upper works and the lower works may be required. The individual components can then be transported separately to the job site where they are reassembled.

The typical past practice has been to undeck the upper works from the lower works. This disassembly of a conventional crane can also be both labor-intensive and time-consuming, adding additional expense to the undecking and redecking operations. This is primarily due to the large number of high-strength fasteners connecting the upper works assembly to the lower works assembly.

To overcome this problem, several quick disconnect systems have been developed. Several such machine designs, many of which are patented, are disclosed in an article entitled "Solving The Quick-Disconnect Problem For Big Bearings" in the Jul. 7, 1983 issue of Machine Design. For examples of previously patented approaches to solving this problem, see U.S. Pat. Nos. 4,478,340; 4,436,444; 4,248,488; 3,941,252; 3,923,407; 3,921,817; 3,726,418 and 2,965,245.

Finally, crane redecking can present alignment difficulties as well. In a conventional crane, the bearing bolt holes in the upper works assembly must be aligned precisely with the mounting-surface holes in the lower works assembly during redecking of the crane. Cranes employing quick disconnect systems which undeck at the swing bearing also require precise longitudinal, transverse and vertical alignment. Because the separate assemblies are large and heavy, such alignments can be unwieldy and time consuming. As a result, the separate assemblies are designed to align with a certain amount of tolerance from the desired position.

The upper works generally houses the prime power source, usually a source of pressurized hydraulic fluid such as a diesel engine powered hydraulic pump or pumps. The lower works usually include numerous hydraulicly powered components, such as hydraulic cylinders and motors for powering the crawlers, the swing drive, luffing jib winch, and auxiliary cylinders. The disconnection between the upper works and lower works thus also involves disconnecting the hydraulic lines between the pumps and the hydraulicly powered components. Where numerous hydraulic lines are involved, especially when they are of a large size and built to withstand high pressure, the disconnection and reconnection of these hydraulic lines can be a formidable task, even when each of the lines is fitted with a coupling designed for easy connection and disconnection.

One possible solution to having multiple couplings is to gang the couplings together so that all connections can be made simultaneously. However, even such a ganged coupling can present an additional problem. The tolerances required for aligning the couplings will be fairly small when compared with the tolerances in the alignment of the upper works and lower works. Thus, even when the upper works and lower works are aligned and secured together, the ganged couplings, respective halves of which are mounted on the upper works and lower works, may not be aligned sufficiently to make the coupling connections. Because of the massive size of the upper works and lower works, getting them better aligned, or reducing their alignment tolerance, is nearly impossible.

SUMMARY OF THE INVENTION

A multi-coupling device for connecting multiple hydraulic lines between first and second portions of a crane has been invented. The device is for use where the crane portions are not aligned with a tolerance as small as that necessary for connecting the hydraulic line couplings. The multi-coupling device comprises a first plate rigidly holding the first part of each of the couplings in a spaced relationship, the first plate being rigidly fixed to a first crane portion; a second plate rigidly holding the second part of each of the couplings in a spaced relation corresponding to the spaced relation of the first coupling parts; a mounting device which mounts the second plate on a second crane portion with a freedom of movement at least as great as the tolerance in alignment between the first and second crane portions; and alignment means for aligning the first and second plates.

The invention allows for the alignment of the coupling members even though the tolerance of the alignment between the crane portions is not as small as the coupling alignment tolerance. In preferred embodiments, a pressurizable cylinder is used to force the first and second plates together, and chamfered guide pins extending from one of the plates, and apertures in the other of the plates, are used to align the plates. As the guide pins start to enter the apertures, the chamfer will force the mounting device to shift to align the couplings.

These and other advantages of the present invention, as well as the preferred embodiments thereof, will best be understood in view of the appended drawings, a brief description of which follows.

BRIEF DESCRIPTION OF THE DRAWINGS

FIG. 4 is an enlarged view of the multi-connect device shown in FIG. 3.

FIG. 5 is a cross-sectional view taken along line 5—5 of FIG. 4.

FIG. 6 is a cross-sectional view taken along line 6—6 of FIG. 5.

FIG. 7 is a cross-sectional view taken along line 7—7 of FIG. 5.

FIG. 8A is a cross-sectional view taken along line 8A—8A of FIG. 5.

FIG. 8B is a view similar to FIG. 8A with the couplings disconnected.

FIG. 9 is a partial cross-sectional view taken on a plane through the bolts shown in FIG. 4.

FIG. 10 is an elevational view of the mounting plate used to hold the multi-coupling device of FIG. 4 to the crane.

DETAILED DESCRIPTION OF THE DRAWINGS AND PREFERRED EMBODIMENTS OF THE INVENTION

The preferred embodiment of the present invention relates to a self-assembling crane, other aspects of which are disclosed in the following copending applications assigned to the assignee of the present application, being filed concurrently herewith unless otherwise specified:

"Self-Assembling and Self-Disassembling Crawler Crane," (Ser. No. 097/762,767);

"Quick-Connect Sectional Boom Members for Cranes and the Like," filed Jul. 25, 1991 (Ser. No. 07/736,029);

"Crane Upper Works to Lower Works Alignment System," (Ser. No. 07/762,765);

"Carbody to Crawler Connection," (Ser. No. 07/762,764);

"Easily Removable Sheave Assembly,"(Ser. No. 07/762,766);

"Control and Hydraulic System for a Liftcrane," filed Oct. 10, 1989 (Ser. No. 07/418,879); and "Control and Hydraulic System for Liftcrane," filed Aug. 13, 1990 (Ser. No. 07/566,751), a continuation-in-part application of Application Ser, No. 07/418,879.

The crane of the preferred embodiment also uses the swing lock mechanism disclosed in U.S Pat. application Ser. No. 07/556,840, filed Jul. 23, 1990. Each of these applications is hereby incorporated by reference.

Figure 1:
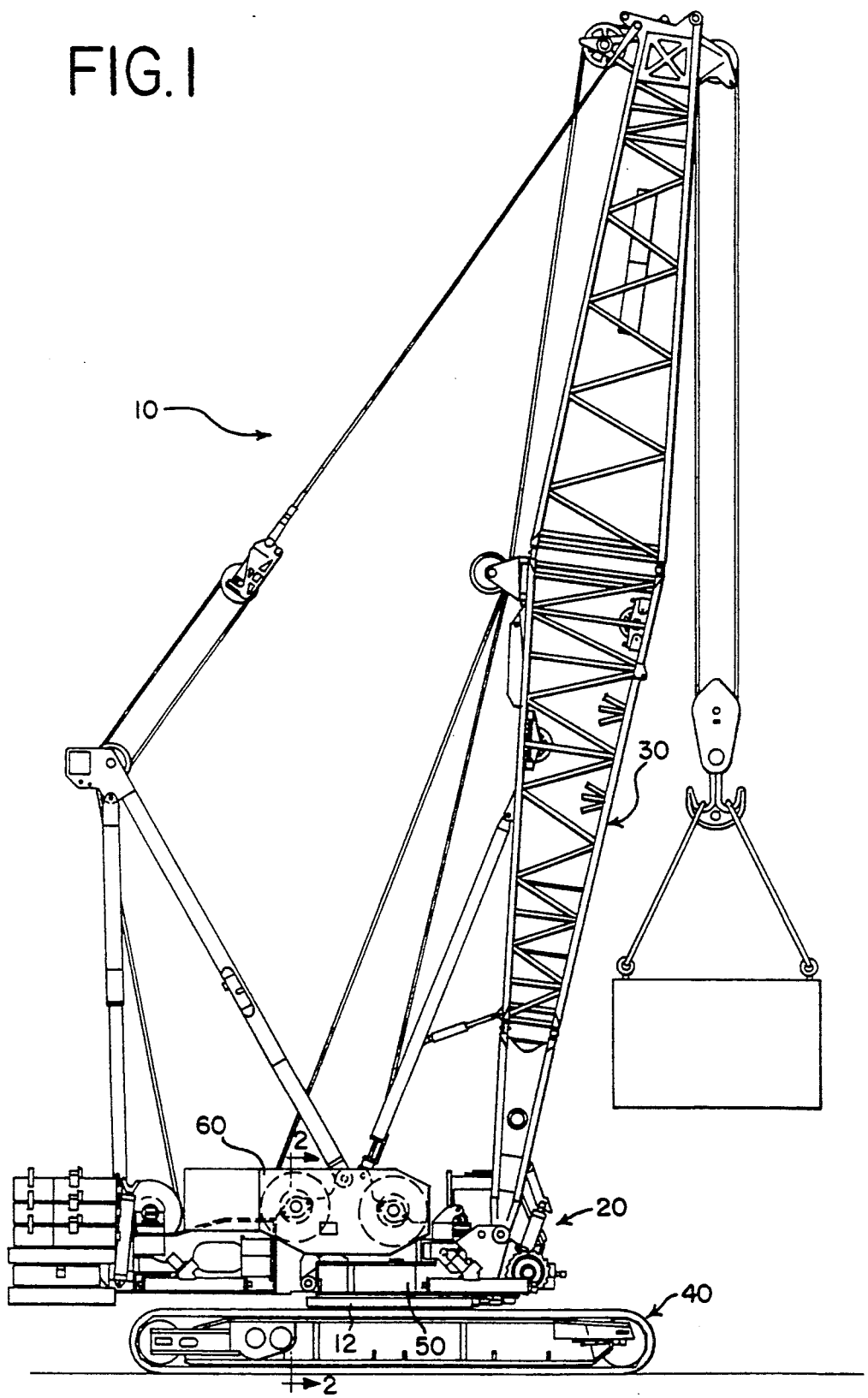
FIG. 1 is a side elevational view of a crane embodying the present invention.

As shown in FIG. 1, the crane 10 of the preferred embodiment of the present invention includes an upper works 20, a boom 30 and lower works 40. The upper works 20 and lower works 40 are connected by a swing bearing 12. In the preferred embodiment, the upper works comprises an adapter frame 50 and a rotating bed 60. As explained in detail in the aforementioned patent application, "Crane Upper Works to Lower Works Alignment System," Ser. No. 07/762,765 the adapter frame 50 stays connected to the carbody of the lower works 40 through the swing bearing 12 when the crane 10 is disassembled. The adapter frame 50 and rotating bed 60 are designed to align with a tolerance of about ±¼ inch.

The rotating bed 60 includes load hoist equipment and other elements well known in the art (not shown). In the preferred embodiment, the rotating bed 60 includes a diesel engine which powers one or more hydraulic pumps. These pumps in turn supply pressurized hydraulic fluid to the hydraulicly powered components of the crane 10, many of which are on the lower works 40 of the adapter frame 50. Hydraulic lines run between the source of pressurized hydraulic fluid and the hydraulicly powered components. For those lines which pass between disconnectable portions of the crane 10, such as the rotating bed 60 (a first crane portion) and the adapter frame 50 and lower works 40 (a second crane portion), a coupling is provided in the hydraulic line. In the preferred embodiment of the invention, the coupling for each of the lines that run between the rotating bed 60 and the adapter frame 50 or lower works 40 are located together in a multi-coupling device 100, shown in FIGS. 2-8.

Figure 2:
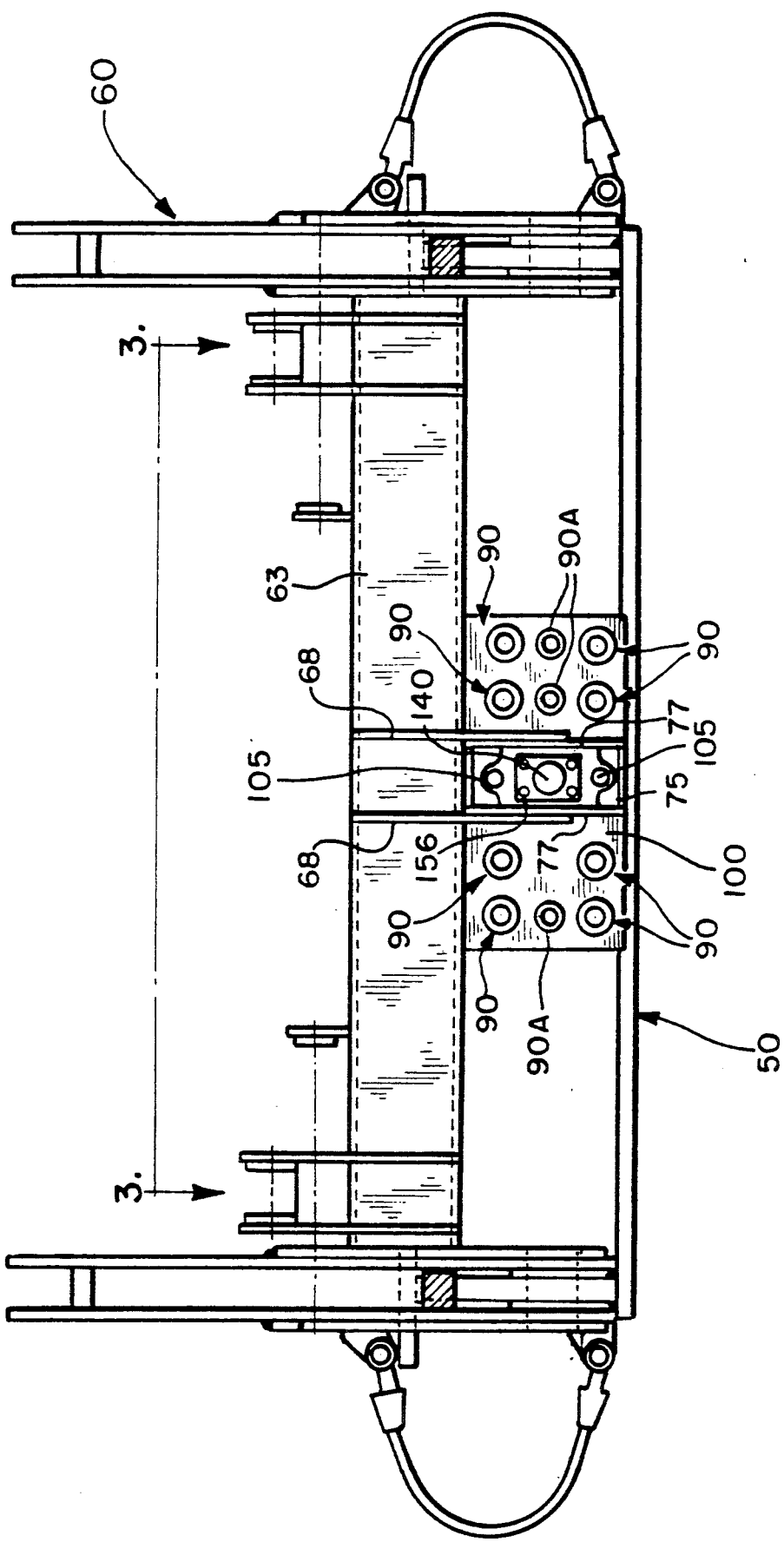
FIG. 2 is a partial sectional view showing the placement of the multi-coupling device on the back side of the swing bearing, looking forward from the plane represented by the line 2—2 in FIG. 1.
Figure 3:
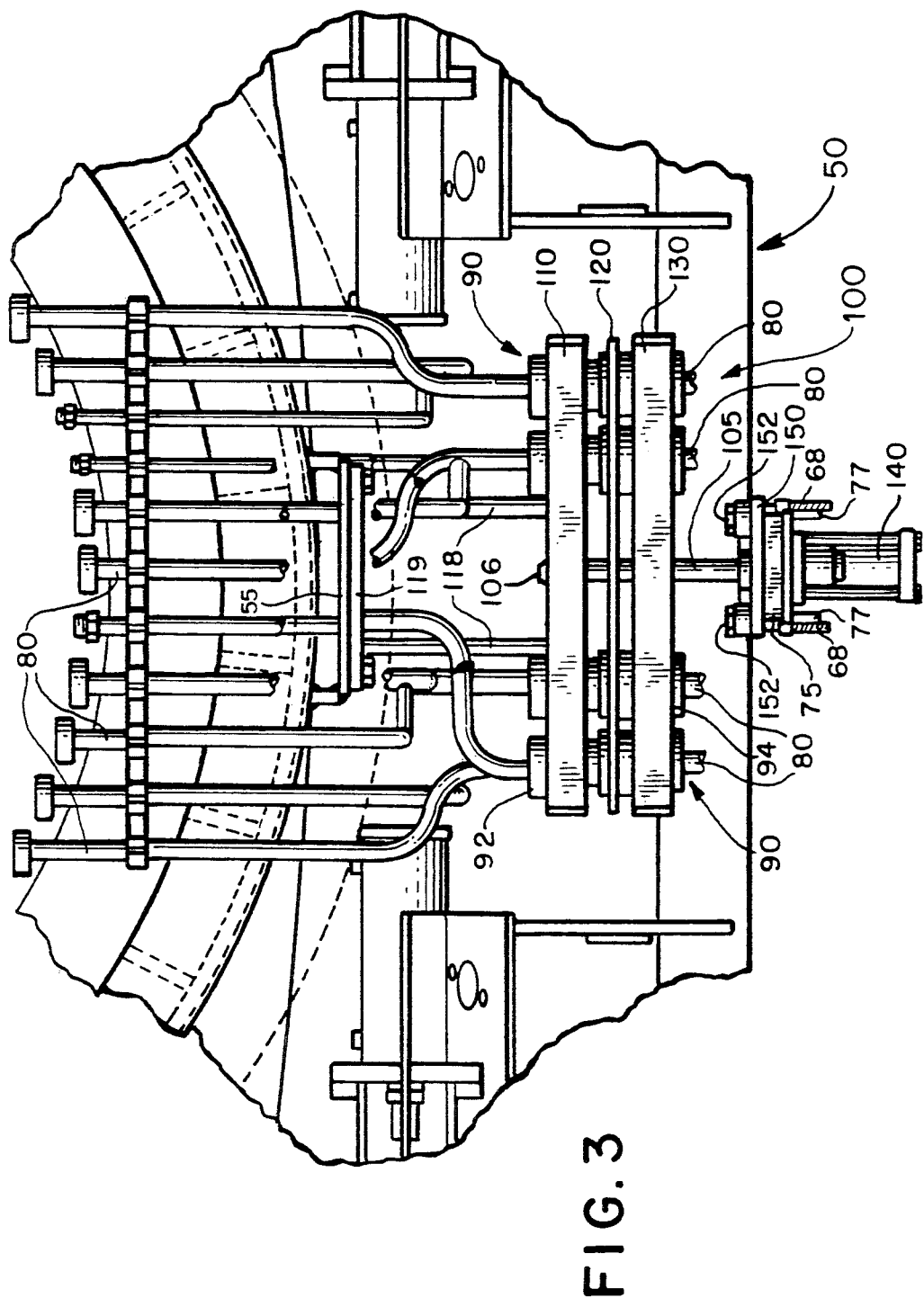
FIG. 3 is a partial sectional and top plan view taken along line 3—3 of FIG. 2.

As best seen in FIGS. 2 and 3, the multi-coupling device 100 preferably sits in the center of the upper back portion of the adapter frame 50. The multi-coupling device, as best seen in FIG. 4, is made of several members, including a nipple plate 110, a sleeve plate 120, a coupler plate 130, an air cylinder 140 and a cylinder plate 150. For clarity, the hydraulic lines 80 are shown broken away in FIG. 3, and are omitted from the other figures.

The hydraulic line couplings 90 used in the preferred embodiment of the invention include a nipple 92, a coupler 94 and a sleeve 96. A preferred coupling is the HNS series panel mount couplings, and 71 Series disconnects modified for panel installation, from Snap-tite Inc., Union City, Pa. The sleeve 94 is slidably mounted on the coupler 94 such that sliding of the sleeve 96 allows disconnection of the nipple 92 and coupler 94. Connection is made by forcing the nipple 92 and coupler 94 together. A proper alignment usually has a tolerance of only a few thousandths of an inch. Spring loaded elements inside the couplings 90 keep the couplings from disconnecting until the sleeve 96 is pushed back on the coupler 94. Such couplings are conventional and are therefore not further described in detail.

In the preferred embodiment, eight of such couplings 90 and three smaller couplings 90A are ganged together (FIG. 5). The three smaller couplings 90A have a nipple and a coupler, but no sleeve, and must be held together by an external force.

The nipple plate 110 rigidly holds each nipple 92 for all 11 couplings in a spaced relation. As shown in FIGS. 6 and 7, the nipple plate 110 has holes in which the body of the nipples 92 sit. Shoulder 111 on the front of the nipples 92 and a retaining ring 112 on the back of the nipples 92 adjacent the back of nipple plate 110 holds the nipples 92 in place.

The coupler plate 130 likewise rigidly holds each coupler 94 in a spaced relation corresponding to the spaced relation of the nipples 92. For the small couplings 90A, the coupler plate includes sections 131 bolted onto but spaced from the rest of the coupler plate 130 (FIG. 7). These sections capture the coupling 94 of the couplings 90A and move them simultaneously with the couplers 94 of the large couplings 90. Retaining rings 132 and shoulders 133 on the couplers 94 hold the couplers 94 into the coupler plate 130.

Sleeve plate 120 rigidly holds each sleeve 96 (for the couplings 90 that include sleeves) and is mounted so that the sleeves 96 may slide longitudinally on their respective couplers 94. Sleeve plate 120 includes apertures for the bolted sections 131 of coupler plate 130 to pass through.

The air cylinder 140 is a double acting cylinder with a piston 142 (FIG. 8A) having a rod end 144 connected on the end of the piston 142. The rod end 144 includes a shoulder 146 and a retaining ring 148. The rod end 144 extends slidably through both the coupler plate 130 and the sleeve plate 130. The shoulder 146 and retaining ring 148 act as retaining elements for pushing the coupler plate 130 away from the cylinder 140 and for pulling the sleeve plate 120 towards the cylinder 140. The cylinder 140 directly acts on coupler plate 130 to move the coupler plate 130 and nipple plate 110 toward each other to connect the couplings 90. Once the couplings 90 are connected, coupler plate 130 is held by the force of the couplings 90 from moving away from nipple plate 110. However, the cylinder 140 may retract, the retaining ring 148 bearing against sleeve plate 120. In this mode, the cylinder 140 provides a means for moving the sleeve plate 120 with respect to the coupler plate 130. As the sleeves 96 are slid back on their couplers 94, the couplings 90 disconnect.

The multi-coupling device 100 also includes two guide pins 105 for aligning the nipple plate 110 and coupler plate 130 such that the nipples 92 and couplers 94 are aligned with a sufficient degree of tolerance to mate. The ends 106 of the guide pins 105 are preferably chamfered. In the preferred embodiment, the nipple plate 110 includes apertures formed by bushings 114 molded into sleeve plate 110 into which the guide pins 105 slide. The coupler plate 130 also has bushings 134 welded therein. Retaining rings 107 on each side of bushing 134 securely holds coupler plate 130 to the guide pins 105 Thus movement of a coupler plate 130 by cylinder 140 also causes movement of the guide pins 105 into and out of bushings 114.

Cylinder plate 150 also includes bushings 154 for slidably receiving guide pins 105. The cylinder 140 is rigidly secured to the cylinder plate 150 by bolts 156.

The multi-coupling device 100 is preferably mounted to the crane 10 such that the nipple plate 110 and nipples 92 are mounted to the adapter frame 50 and the cylinder 140, coupler plate 130, sleeve plate 110 and guide pins 105 are mounted on the rotating bed 60. In the preferred embodiment, the nipple plate 110 is rigidly fixed to the adapter frame 50. As best seen in FIG. 3, the nipple plate 110 is welded to parallel support plates 118 which is turn are welded to a cross piece 119 bolted onto a receiving plate 55 secured to the adapter frame 50.

The cylinder plate 150 is secured to a mounting plate 75, which in turn in fixed to the rotating bed 60. As shown in FIG. 2, two parallel support plates 68 are welded to a hollow, square cross tube 63 making up the frame of the rotating bed 60. The support plates extend below the bottom of the rotating bed 60, and are welded to back flanges 77 on mounting plate 75 (FIGS. 3 and 4).

As shown in FIG. 10, the mounting plate 75 includes a large opening 76 through which the cylinder 140 and guide pins 105 pass. The cylinder plate 150 is secured to the mounting plate 75 by an attachment which allows a freedom of movement at least as great as the tolerance in the alignment between the adapter frame 50 and rotating bed 60.

This is accomplished in the preferred embodiment by using four shoulder bolts 152 and enlarged bores 154 through thickened sections near each corner of cylinder plate 150. The shoulder bolts 152 have shanks slightly longer than the depth of the bores 154 so that when the bolts 152 are tight, the cylinder plate 150 may still move laterally with respect to mounting plate 75. The difference in the diameters of the bores 154 and bolts 152 is at least equal to the tolerance in the alignment between the rotating bed 60 and the adapter frame 50.

As best seen in FIG. 8B, when the guide pins 105 try to enter the aperture formed by bushings 114 in nipple plate 110 and the couplings are not aligned, the forcing of the chamfered ends 106 creates a lateral force for automatically aligning the nipple plate 110 and the coupler plate 130. This force is transmitted through the guide pins 105 to cylinder plate 150. Due to the slidable connection of the cylinder plate 150 and mounting plate 75, the multi-coupling device 100 is able to align itself.

While the invention has been described in conjunction with a disconnectable adapter frame 50 and rotating bed 60, the multi-coupling device of the present invention can be used between other disconnectable portions of a crane. While the embodiment shown couples 11 hydraulic lines, any number of hydraulic line couplers could be accommodated simply by changing the configuration of the nipple plate 110, sleeve plate 120 and coupler plate 130. Also, other types of couplings besides those having a sleeve may be used.

In other embodiments of the invention, the nipple plate 110, in addition to or instead of the coupler plate 130, could be mounted so as to allow translational movement. The bores 156 could be formed in mounting plate 75 rather than in cylinder plate 150. The air cylinder 140 could be a hydraulic cylinder.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A multi-coupling device for connecting multiple hydraulic lines between first and second portions of a crane that are not aligned with a tolerance as small as that necessary for connecting hydraulic line couplings, wherein the couplings each have two mating parts respectively secured to each of the two crane portions, the multi-coupling device comprising:
   a) a first plate rigidly holding the first part of each of said couplings in a spaced relationship, said first plate being rigidly fixed to said first crane portion;
   b) a second plate rigidly holding the second part of each of said couplings in a spaced relation corresponding to the spaced relation of the first coupling parts;
   c) a mounting device which mounts said second plate on said second crane portion with a freedom of movement at least as great as the tolerance in alignment between the first and second crane portions; and
   d) alignment means for aligning said first and second plates.

2. The multi-coupling device of claim 1 further comprising a pressurizable cylinder for forcing said first and second plates together.

3. The multi-coupling device of claim 2 wherein the mounting device comprises a mounting plate fixed to said second crane portion and a cylinder plate fixed to said cylinder.

4. The multi-coupling device of claim 3 wherein one of the cylinder and mounting plates has a bore therethrough with a shoulder bolt extending through the bore and into the other of said cylinder and mounting plates, the shoulder bolt having a diameter smaller than that of the bore, thus allowing the cylinder plate to move laterally with respect to the mounting plate.

5. The multi-coupling device of claim 4 wherein the bore is in the cylinder plate.

6. The multi-coupling device of claim 1 wherein the alignment means comprises guide pins extending from one of said first and second plates and apertures in the other of said first and second plates for receiving said guide pins.

7. The multi-coupling device of claim 6 wherein the guide pins are chamfered on their ends and engagement of the chamfered ends with said apertures as said guide pins are forced into said apertures creates lateral forces for aligning the first and second plates.

8. A multi-coupling device for simultaneously connecting and disconnecting a plurality of hydraulic line couplings between disconnectable portions of a crane, each coupling comprising a nipple, a mating coupler and a sleeve slidable mounted on the coupler whereby sliding of the sleeve allows disconnection of the nipple and coupler, the multi-coupling device comprising:
   a) a nipple plate rigidly holding each nipple in a spaced relation;
   b) a coupler plate rigidly holding each coupler in a spaced relation corresponding to the spaced relation of the respective nipple;
   c) a sleeve plate rigidly holding each sleeve and mounted so that said sleeves may slide longitudinally on their respective couplers;
   d) means for aligning said nipple and coupler plates so as to align the respective nipples and couplers;
   e) means for moving said coupler and nipple plates toward each other to connect said couplings;
   f) means for moving said sleeve plate with respect to said coupler plate, allowing disconnection of the nipples and couplers; and
   g) mounting means for mounting said nipple plate and said coupler plate on different disconnectable portions of the crane, said mounting means allowing lateral movement between at least one of the crane portions and the respective nipple or coupler plate mounted thereto.

9. The multi-coupling device of claim 8 wherein the nipple plate is fixed to a first crane portion and the mounting means allows lateral movement between the coupler plate and a second crane portion.

10. The multi-coupling device of claim 8 wherein the means for moving said nipple and coupler plates towards each other comprises a pressurizable cylinder.

11. The multi-coupling device of claim 10 wherein said cylinder is mounted on a cylinder plate, and said aligning means comprises guide pins extending from said cylinder plate, through said coupler plate and sleeve plate and into apertures in said nipple plate.

12. The multi-coupling device of claim 11 wherein the guide pins are slidably attached to said cylinder plate and fixedly attached to said coupler plate.

13. The multi-coupling device of claim 10 wherein the cylinder comprises a piston with a rod end thereon extending slidably through both of said coupler and sleeve plates and having retaining elements on the rod end for pushing the coupler plate away from the cylinder and pulling the sleeve plate towards the cylinder.

14. The multi-coupling device of claim 10 wherein said mounting means comprises a cylinder plate rigidly connected to said cylinder and a mounting plate rigidly fixed to said at least one crane portion, said mounting and cylinder plates being secured together in a manner that allows sliding movement between the mounting and cylinder plates.

15. The multi-coupling device of claim 14 wherein the cylinder plate comprises one or more bores with one or more shoulder bolts extending therethrough and into said mounting plate, the one or more bores having a greater diameter than the diameter of the respective bolt extending therethrough.

16. The multi-coupling device of claim 8 wherein both of said moving means are comprised of a double acting cylinder.

17. A crane having:
   a) an adapter frame secured through a swing bearing to a lower works, said adapter frame and lower works comprising a plurality of hydraulically driven components;
   b) an upper works securable to said adapter frame, said upper works comprising a source of pressurized hydraulic fluid;
   c) multiple hydraulic lines, each with a coupling therein, running between said source of pressurized hydraulic fluid and said hydraulically driven components, said coupling comprising a nipple and a coupler having an alignment tolerance required for mating with the nipple;
   d) the upper works and adapter frame being connected with a tolerance in the alignment between the upper works and the adapter frame greater than the alignment tolerance necessary to connect said nipple and coupler;
   e) a nipple plate rigidly holding said nipples in a spaced relation, said nipple plate being connected to said adapter frame in a fixed position;
   f) a coupler plate rigidly holding said couplers in a spaced relation corresponding to the spaced relation of the nipples, the coupler plate being mounted to said upper works with a freedom of lateral movement greater than the tolerance in alignment between the upper works and the adapter frame; and
   g) guide pins extending from said nipple plate or said coupler plate and apertures in the other of said nipple plate and coupler plate for aligning said nipples and couplers as said nipple and coupler plates are brought together and said guide pins slide into said apertures.

18. The crane of claim 17 further comprising a pressurizable cylinder for moving said coupler plate into a connective position with said nipple plate.

19. The crane of claim 18 wherein the cylinder is mounted on a cylinder plate and said guide pins slidably extend through said cylinder plate.

20. The crane of claim 19 further comprising a mounting plate fixed to said upper works and wherein the cylinder plate comprises a plurality of bores and is mounted to said mounting plate by shoulder bolts having a diameter smaller than the bore diameter, said difference in bore and bolt diameters being at least equal to the tolerance in the upper works—lower works alignment.

* * * * *

UNITED STATES PATENT AND TRADEMARK OFFICE
CERTIFICATE OF CORRECTION

PATENT NO. : 5,148,929

DATED : September 22, 1992

INVENTOR(S) : Wernecke et al.

It is certified that error appears in the above-identified patent and that said Letters Patent is hereby corrected as shown below:

On the title page, column 1, under the heading "Assignee:", after "Company" insert --,--.

Column 3, line 23, delete "097/762,767" and substitute therefor --07/762,767--.

Column 3, line 37, delete "Ser," and substitute therefor --Ser.--.

Column 3, line 39, delete "U.S. Pat. application" and substitute therefor --Application--.

Column 4, line 64, delete "130" and substitute therefor --120--.

Column 5, line 22, after "105" insert --.--.

Column 5, line 36, delete "is" and substitute therefor --in--.

UNITED STATES PATENT AND TRADEMARK OFFICE
CERTIFICATE OF CORRECTION

PATENT NO. : 5,148,929

DATED : September 22, 1992

INVENTOR(S) : Wernecke et al.

It is certified that error appears in the above-identified patent and that said Letters Patent is hereby corrected as shown below:

Column 5, line 39, delete "in fixed" and substitute therefor --is fixed--.

Signed and Sealed this

Twenty-ninth Day of March, 1994

*Attest:*

BRUCE LEHMAN

*Attesting Officer*     *Commissioner of Patents and Trademarks*